US011502517B2

(12) United States Patent
Pipher et al.

(10) Patent No.: US 11,502,517 B2
(45) Date of Patent: Nov. 15, 2022

(54) REMOTE SHARED CONTENT EXPERIENCE SYSTEMS

(71) Applicant: T-Mobile USA, Inc., Bellevue, WA (US)

(72) Inventors: Nicholas Pipher, Parker, CO (US); Will Tucker, Centennial, CO (US)

(73) Assignee: T-MOBILE USA, INC., Bellevue, WA (US)

( * ) Notice: Subject to any disclaimer, the term of this patent is extended or adjusted under 35 U.S.C. 154(b) by 114 days.

(21) Appl. No.: 16/904,066

(22) Filed: Jun. 17, 2020

(65) Prior Publication Data
US 2021/0400005 A1 Dec. 23, 2021

(51) Int. Cl.
*G06F 15/16* (2006.01)
*H02J 3/14* (2006.01)
*H01R 24/68* (2011.01)
*H04L 12/28* (2006.01)
*H04L 67/125* (2022.01)
(Continued)

(52) U.S. Cl.
CPC .................. *H02J 3/14* (2013.01); *G06F 1/26* (2013.01); *G06F 3/165* (2013.01); *G10L 25/51* (2013.01); *H01R 13/02* (2013.01); *H01R 13/6675* (2013.01); *H01R 13/6691* (2013.01); *H01R 13/74* (2013.01); *H01R 24/68* (2013.01); *H01R 31/06* (2013.01); *H01R 31/065* (2013.01); *H02B 1/42* (2013.01); *H02G 3/10* (2013.01); *H02G 3/18* (2013.01); *H02J 13/00004* (2020.01); *H02J 13/00007* (2020.01); *H02M 1/10* (2013.01); *H04L 12/2803* (2013.01); *H04L 51/222* (2022.05); *H04L 65/403* (2013.01); *H04L 65/60* (2013.01); *H04L 67/1095* (2013.01); *H04L 67/125* (2013.01); *H04R 1/1041* (2013.01); *H01R 2105/00* (2013.01); *H02J 13/00024* (2020.01); *H02J 13/00026* (2020.01); *H02J 2310/14* (2020.01);
(Continued)

(58) Field of Classification Search
CPC ....... H04L 51/20; H04L 65/403; H04L 65/60; H04L 67/1095; G06F 3/165; G10L 25/51; H04R 1/1041
USPC .................................................. 709/206, 224
See application file for complete search history.

(56) References Cited

U.S. PATENT DOCUMENTS 6,409,599 B1 6/2002 Sprout et al.
9,826,012 B2 11/2017 Hao et al.
(Continued)

OTHER PUBLICATIONS

Author Unknown, "About Watch2Gether," https://www.watch2gether.com/?lang=en, 3 pages, 2018.
(Continued)

*Primary Examiner* — Karen C Tang
(74) *Attorney, Agent, or Firm* — Brownstein Hyatt Farber Schreck, LLP

(57) ABSTRACT

A system provides a "virtual room" for remotely sharing content experiences via electronic devices at different locations. The system may enable synchronization of the content at the different locations, access control, be able to provide and/or experience interaction feedback regarding the content, control the interaction feedback that is provided and/or experienced, enhance the ability of people to distinguish the content from the interaction feedback, and so on. As such, people may be able to share content experiences more like they were present in a single location while remote from each other.

20 Claims, 10 Drawing Sheets

(51) Int. Cl.

| | |
|---|---|
| *G06F 1/26* | (2006.01) |
| *H01R 13/66* | (2006.01) |
| *H01R 31/06* | (2006.01) |
| *H02B 1/42* | (2006.01) |
| *H02M 1/10* | (2006.01) |
| *H01R 13/02* | (2006.01) |
| *H01R 13/74* | (2006.01) |
| *H02G 3/10* | (2006.01) |
| *H02G 3/18* | (2006.01) |
| *H02J 13/00* | (2006.01) |
| *G06F 3/16* | (2006.01) |
| *G10L 25/51* | (2013.01) |
| *H04L 65/403* | (2022.01) |
| *H04L 65/60* | (2022.01) |
| *H04L 67/1095* | (2022.01) |
| *H04R 1/10* | (2006.01) |
| *H04L 51/222* | (2022.01) |
| *H01R 105/00* | (2006.01) |
| *H04W 4/80* | (2018.01) |
| *H04W 84/12* | (2009.01) |

(52) U.S. Cl.
CPC ....... *H04L 2012/2841* (2013.01); *H04W 4/80* (2018.02); *H04W 84/12* (2013.01)

(56) References Cited

U.S. PATENT DOCUMENTS

| | | | | |
|---|---|---|---|---|
| 10,255,907 | B2* | 4/2019 | Nallasamy | G10L 15/16 |
| 10,289,193 | B2 | 5/2019 | Hardy et al. | |
| 10,491,979 | B1* | 11/2019 | Stradley | G06F 1/1632 |
| 10,747,495 | B1* | 8/2020 | Kakulamarri | H04R 3/12 |
| 11,032,328 | B1* | 6/2021 | Little | H04L 65/4007 |
| 11,049,072 | B1* | 6/2021 | Little | H04L 12/1831 |
| 11,150,864 | B2* | 10/2021 | Mukherji | G11B 27/34 |
| 2010/0241512 | A1 | 9/2010 | Tirpak et al. | |
| 2015/0363099 | A1* | 12/2015 | Mattingly | G06F 3/04847 |
| | | | | 715/720 |
| 2018/0337963 | A1* | 11/2018 | Faulkner | H04L 67/26 |
| 2019/0108578 | A1* | 4/2019 | Spivack | G09G 5/14 |
| 2020/0201512 | A1* | 6/2020 | Faulkner | H04N 7/155 |
| 2021/0026998 | A1* | 1/2021 | Hoppe | H04N 7/157 |
| 2021/0076002 | A1* | 3/2021 | Peters | G06K 9/00718 |
| 2021/0120058 | A1* | 4/2021 | Schmidt | H04L 65/602 |
| 2021/0337167 | A1* | 10/2021 | Garg | H04N 7/152 |
| 2021/0342785 | A1* | 11/2021 | Mann | G06Q 10/103 |

OTHER PUBLICATIONS

Author Unknown, "In-Game Chat: What Parents Need to Know," https://parentzone.org.uk/article/game-chat-what-parents-need-know, 5 pages, at least as early as May 28, 2020.
Author Unknown, "Long Distance Movie Night," https://letggaze.com/#/, 4 pages, 2014.
Author Unknown, "Netflix Party," https://www.netflixparty.com/, 4 pages, at least as early as May 28, 2020.
Author Unknown, Share on Rabbit, https://chrome.google.com/webstore/detail/share-on-rabbit/, 1 page, Jan. 15, 2019.
Author Unknown, "Syncplay keeps your media players in sync so you can watch videos with your friends," https:/syceplay.pl/, 2 pages, 2020.
Author Unknown, "Sync Video," https://syce-video.com/, 4 pages, 2019.
Author Unknown, "Virtual Reality," https://www.plex.tv/your-media/virtual-reality/, 12 pages, 2020.
Author Unknown, "Watch Videos Together," https://www.mycircle.tv/, 2 pages, 2020.
Author Unknown, "What's Live? Everything. Watch Now," https://www.twitch.tv/p/en/watch/?utm_referrer=https://dev.twitch.tv/, 5 pages 2020.

* cited by examiner

REMOTE SHARED CONTENT EXPERIENCE SYSTEMS

FIELD

The described embodiments relate generally to content systems. More particularly, the present embodiments relate to remote shared content experience systems.

BACKGROUND

People use content experience systems to experience a wide variety of content. Examples of such content experience systems include televisions, mobile and/or other computing devices, and/or other displays and/or other electronic devices that may be used to access broadcast, recorded, and/or on demand programming (such as television shows, movies, and so on) from cable and/or other content providers, video games, sporting events, music and/or other audio, and so on.

Some people use content experience systems alone. However, many people use content experience systems in a group setting. For example, many groups of friends and/or family and/or other associated people watch television and/or other content together, such as during meals and/or as a social occasion. The people may interact with each other while experiencing the content, supplementing the content experience with the experience of interacting with each other related to the content experience.

SUMMARY

The present disclosure relates to providing remote shared content experiences. A system may provide a "virtual room" for remotely sharing content experiences via electronic devices at different locations. The system may enable synchronization of the content at the different locations, access control, the ability to provide and/or experience interaction feedback regarding the content, control the interaction feedback that is provided and/or experienced, enhance the ability of people to distinguish the content from the interaction feedback, and so on. As such, people may be able to share content experiences more like they were present in a single location while remote from each other.

In various embodiments, a system for providing remote shared content experiences includes a communication unit, a non-transitory storage medium that stores instructions, and a processor. The processor executes the instructions to synchronize presentation of at least part of a main content by at least one first electronic device at a first location and at least one second electronic device at a second location; receive first location interaction feedback, via the communication unit, from the first location that is associated with the presentation of the at least part of the main content by the at least one first electronic device; receive second location interaction feedback, via the communication unit, from the second location that is associated with the presentation of the at least part of the main content by the at least one second electronic device; and direct presentation of the first location interaction feedback at the first location by at least one third electronic device.

In some examples, the at least one first electronic device is a display and the at least one third electronic device is a mobile computing device. In various examples, the at least one first electronic device is a first audio output device and the at least one third electronic device is a second audio output device. In some implementations of such examples, the first audio output device is a first ear phone or ear bud and the second audio output device is a second ear phone or ear bud.

In a number of examples, the processor synchronizes presentation of the first location interaction feedback with presentation of the at least part of the main content. In some examples, the processor receives the first location interaction feedback from the at least one first electronic device. In various examples, the processor receives the first location interaction feedback from the at least one third electronic device.

In some embodiments, a system for providing remote shared content experiences includes a communication unit, a non-transitory storage medium that stores instructions, and a processor. The processor executes the instructions to synchronize presentation of a main content by at least one first electronic device at a first location and at least one second electronic device at a second location; receive first location interaction feedback, via the communication unit, from the first location that is associated with the presentation of the main content by the at least one first electronic device; receive second location interaction feedback, via the communication unit, from the second location that is associated with the presentation of the main content by the at least one second electronic device; direct presentation of the first location interaction feedback at the first location by the at least one first electronic device; and determine whether to resynchronize the presentation of the main content by the at least one first electronic device and the at least one second electronic device using the first location interaction feedback or the second location interaction feedback.

In various examples, the processor determines whether to resynchronize the presentation of the main content by identifying the main content in the first location interaction feedback and comparing first location interaction feedback timing with main content timing. In some implementations of such examples, the processor determines to resynchronize presentation of the main content when the first location interaction feedback timing differs from the main content timing more than a resynchronization threshold. In various implementations of such examples, the first location interaction feedback includes audio. In a number of implementations of such examples, the first location interaction feedback includes video.

In some examples, the processor determines whether to resynchronize the presentation of the main content by comparing the first location interaction feedback to the second location interaction feedback. In various implementations of such examples, the processor removes a portion of the first location interaction feedback that is missing from the second location interaction feedback.

In a number of embodiments, a system for providing remote shared content experiences includes a communication unit, a non-transitory storage medium that stores instructions, and a processor. The processor executes the instructions to synchronize presentation of a main content by a first electronic device at a first location, a second electronic device at a second location, and a third electronic device at a third location; receive first location interaction feedback, via the communication unit, from the first location that is associated with the presentation of the main content by the first electronic device; receive second location interaction feedback, via the communication unit, from the second location that is associated with the presentation of the main content by the second electronic device; receive third location interaction feedback, via the communication unit, from the third location that is associated with the presentation of the main content by the third electronic device; generate an interaction feedback selection for the first location from the second location interaction feedback and the third location interaction feedback; and direct presentation of the interaction feedback selection at the first location by the first electronic device.

In various examples, the processor determines that a combination of the second location interaction feedback and the third location interaction feedback is less than a sound threshold and generates the interaction feedback selection by combining the second location interaction feedback and the third location interaction feedback. In some examples, the processor determines that a combination of the second location interaction feedback and the third location interaction feedback equals or exceeds a sound threshold and generates the interaction feedback selection using one of the second location interaction feedback and the third location interaction feedback. In various implementations of such examples, the processor determines the sound threshold based on an audio level of the main content.

In some examples, the processor evaluates previous interaction feedback to determine interest scores associated with previous interactors and generates the interaction feedback selection by selecting between the second location interaction feedback and the third location interaction feedback using the interest scores. In a number or examples, the processor receives user input from the first electronic device and generates the interaction feedback selection using the user input.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1:
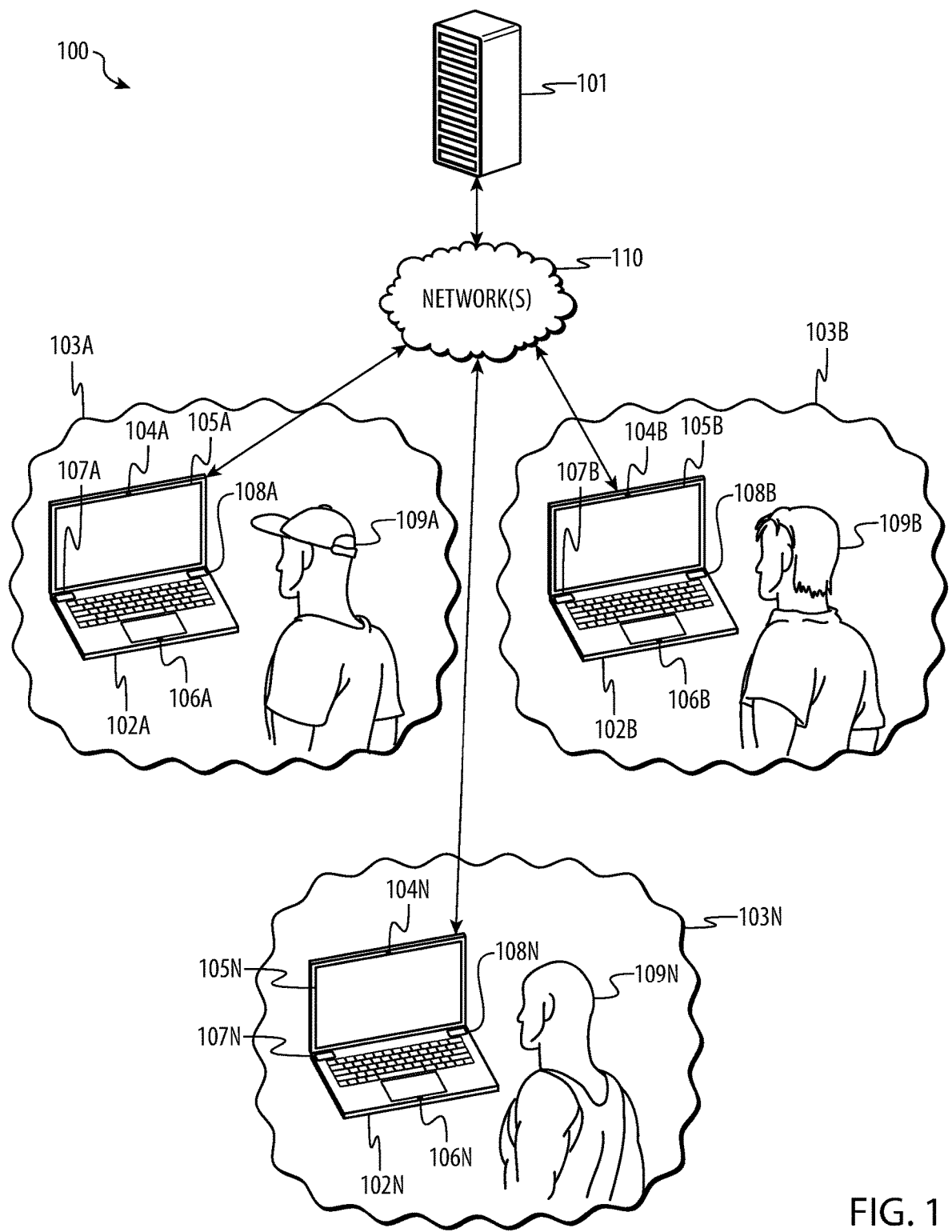
FIG. 1 depicts a first example system for providing remote shared content experiences.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The description that follows includes sample systems, methods, apparatuses, and computer program products that embody various elements of the present disclosure. However, it should be understood that the described disclosure may be practiced in a variety of forms in addition to those described herein.

People may desire to experience content together and/or interact regarding the content, but may not be able to be present at the same location in order to be able to do so. As such, people may find it useful if content provider and/or other systems enabled them to remotely share content experiences. Remotely sharing content experiences may involve a number of technical issues that may render the experiences non-uniform and/or less than optimal. For example, people may find it challenging to experience the same content at the same time, interact with each other while experiencing the content, distinguish both the content and interaction regarding the content, and so on.

The following disclosure relates to providing remote shared content experiences. A system may provide a "virtual room" for remotely sharing content experiences via electronic devices at different locations. The system may enable synchronization of the content at the different locations, access control, be able to provide and/or experience interaction feedback regarding the content, control the interaction feedback that is provided and/or experienced, enhance the ability of people to distinguish the content from the interaction feedback, and so on. As such, people may be able to share content experiences more like they were present in a single location while remote from each other.

In this way, the system may be able to perform functions enabling and/or otherwise related to remote shared content experiences that the system would not previously have been able to perform absent the technology disclosed herein. The technology disclosed herein may enable the system to operate more efficiently while consuming fewer hardware and/or software resources as more resource consuming and/or less functional techniques may be omitted. This may provide enhanced functionality, provide greater system flexibility, improve system operating efficiency, reduce unnecessary hardware and/or software, reduce resource consumption, and so on.

These and other embodiments are discussed below with reference to FIGS. 1-10. However, those skilled in the art will readily appreciate that the detailed description given herein with respect to these Figures is for explanatory purposes only and should not be construed as limiting.

FIG. 1 depicts a first example system 100 for providing remote shared content experiences. The system 100 may include one or more system devices 101 that are operable to communicate with one or more electronic devices 102A, 102B, 102N at one or more different locations 103A, 103B, 103N via one or more networks 110 (such as one or more internet networks, WiFi networks, cellular networks, and so on) to provide remote shared content experiences.

The system device 101 may provide access to a virtual room for remotely sharing content experiences via the electronic devices 102A, 102B, 102N at the locations 103A, 103B, 103N. The system device 101 may enable synchronization of the content at the different locations 103A, 103B, 103N, control access, provide the content via the electronic devices 102A, 102B, 102N, provide the ability for people 109A, 109B, 109N to provide and/or experience interaction feedback regarding the content via the electronic devices 102A, 102B, 102N, control the interaction feedback that is provided and/or experienced, enhance the ability of the electronic devices 102A, 102B, 102N to distinguish the content from the interaction feedback, and so on. As such, the electronic devices 102A, 102B, 102N may be able to share content experiences more like they were present in a single location while remote from each other.

For example, the person 109A may use the electronic device 102A to communicate with the system device 101 in order to set up a virtual room for other people to access, invite the other people, control the content that is presented via the virtual room (such that the person 109A may be a moderator of the room), control the people that are able to access the virtual room, control interaction feedback that the other people provide and/or that is provided to the person 109A and/or the other people, control the other people that are able to control aspects of the virtual room (such that the other people are able to be partial and/or full moderators of the virtual room), and so on. The person 109A may be able to create the virtual room, configure the virtual room to be available for a single use, configure the virtual room to be available whenever the person 109A wants, configure the virtual room to be scheduled for a particular time slot, and so on. In some examples, the person 109A may configure a machine-learning algorithm that is able to learn from input provided by the person 109A to perform one or more of these actions automatically on behalf of the person 109A.

The virtual room may provide any type of content. Such content may include broadcast content like broadcast television programs, sporting events, movies, and so on. Such content may also include on demand and/or other recorded content, video games, music and/or other audio, still images, and so on. In some examples, the system device 101 may provide the content. In other examples, the system device 101 may facilitate providing the content from one or more other content servers, one or more of the electronic devices 102A, 102B, 102N, and so on.

The electronic devices 102A, 102B, 102N may execute one or more user interfaces for presenting the content, interaction feedback associated with the content, and/or other aspects of the content. Such user interfaces may also enable the people 109A, 109B, 109N to provide interaction feedback associated with the content, such as text (such as provided via text chat, text message, and so on), voice, video, and/or other interaction feedback. In some examples, the electronic devices 102A, 102B, 102N may present user interfaces provided by and/or via the system device 101. In other examples, the electronic devices 102A, 102B, 102N may generate and/or present user interfaces using information provided by and/or via the system device 101. In some examples, the user interface may be capable of being run as a background process, such as where the electronic devices 102A, 102B, 102N are devices, such as smart phones, that may need to be capable of running the user interface as a background process in order to be able to perform other functions (such as executing a web browser and/or making a call) while still executing the user interface. Various configurations are possible and contemplated without departing from the scope of the present disclosure.

For example, the electronic devices 102A, 102B, 102N may include one or more output devices (such as one or more displays 105A, 105B, 105N and/or other visual output devices; left speakers 107A, 107B, 107N and/or other audio devices; right speakers 108A, 108B, 108N, and/or other audio devices; and so on) that the electronic devices 102A, 102B, 102N may use to present one or more portions of the content, the interaction feedback associated with the content, and/or the user interfaces associated with the content (such as video for the content presented via the displays 105A, 105B, 105N and/or other visual output devices; audio for the content presented via left speakers 107A, 107B, 107N and/or other audio devices and/or the right speakers 108A, 108B, 108N, and/or other audio devices; the interaction feedback associated with the content presented via the displays 105A, 105B, 105N and/or other visual output devices; the left speakers 107A, 107B, 107N and/or other audio devices; the right speakers 108A, 108B, 108N, and/or other audio devices; and so on; the user interfaces presented via the displays 105A, 105B, 105N and/or other visual output devices; the left speakers 107A, 107B, 107N and/or other audio devices; the right speakers 108A, 108B, 108N, and/or other audio devices; and so on).

The electronic devices 102A, 102B, 102N may also include one or more input devices (such as one or more cameras 104A, 104B, 104N and/or other image sensors; microphones 106A, 106B, 106N and/or other audio sensors; keyboards; touch screens; track pads; computer mice; buttons; capacitive sensors; force sensors; dials; siders; touch sensors; other sensors; and so on) that the electronic devices 102A, 102B, 102N may use to receive input for controlling the virtual room, receive input for controlling the content being presented, receive input for controlling who may participate in the virtual room, receive interaction feedback related to the content, receive input for controlling interaction feedback related to the content that may be received and/or presented, and so on.

By way of illustration, the system device 101 may provide a user interface via the displays 105A, 105B, 105N that includes a main content window (being main as the content may be the focus of the virtual room and the interaction feedback may be associated with participant interaction related to the content) and one or more interaction feedback windows (and/or different user interfaces presented via different output devices and/or different electronic devices, such as a first device that presents the main content window and one or more others that present one or more feedback interaction windows). The system device 101 may synchronize presentation of a video portion of the content in the main content window on the displays 105A, 105B, 105N; synchronize presentation of an audio portion of the content via one or more of the left speakers 107A, 107B, 107N and/or the right speakers 108A, 108B, 108N; receive interaction feedback video using the cameras 104A, 104B, 104N of the people 109A, 109B, 109N reacting to the content; receive interaction feedback audio using the microphones 106A, 106B, 106N of the people 109A, 109B, 109N reacting to the content; determine which of the interaction feedback video to present via the interaction feedback window or windows; present the determined interaction feedback video via the interaction feedback window or windows via the displays 105A, 105B, 105N; determine which of the interaction feedback audio to present; present the determined interaction feedback audio via one or more of the left speakers 107A, 107B, 107N and/or the right speakers 108A, 108B, 108N; and so on.

For example, the electronic devices 102A, 102B, 102N may obtain interaction feedback by recording audio of the people 109A, 109B, 109N as they experience the content, recording images and/or video of the people 109A, 109B, 109N as they experience the content, obtaining user input (such as text entered via a keyboard, touch screen, and/or similar interface) from the people 109A, 109B, 109N as they experience the content, and so on. In some examples, the people 109A, 109B, 109N may be able to select to have an avatar and/or other image appear instead of images and/or video of them, and/or of other of the people 109A, 109B, 109N presented in their own user interface, reacting to the content. Additionally and/or alternatively, one or more files may be shared, screen shots and/or other captures of content presentation may be shared, and so on. The interaction feedback may include one or more reactions to the content, communications to one or more of each other, reactions to other reactions, and so on.

In some examples, portions of the content and/or the interaction feedback may be output using different devices in order to make the content and/or the interaction feedback more salient to the people 109A, 109B, 109N, less muddled and/or less likely to become confused together, and so on. For example, an audio portion of the content may be presented via the left speakers 107A, 107B, 107N while interaction feedback audio may be presented via the right speakers 108A, 108B, 108N. Alternatively, this arrangement may be reversed. As the respective audio may be received by different ears of the people 109A, 109B, 109N, the people 109A, 109B, 109N may be better able to distinguish between the audio portion of the content and the interaction feedback audio than if the two were received equally by the same ears. This may allow the people 109A, 109B, 109N to perceive and understand both without the audio portion of the content and the interaction feedback audio interfering with each other, becoming muddled and/or otherwise indiscernible to the people 109A, 109B, 109N.

The content may be synchronized using one or more system clocks, time stamps associated with the content, synchronization data structures, feedback mechanisms, and so on. One or more of the people 109A, 109B, 109N may be able to control the presentation of the content (such as starting the presentation, stopping the presentation, skipping part of the presentation, pausing the presentation, selecting different content, fast forwarding the presentation, rewinding the presentation, and so on), control which of the other of the people 109A, 109B, 109N may control the presentation, and so on. The control may be in response to user input provided via one or more user input devices, in response to audio commands detected in interaction feedback audio, in response to gesture commands detected in interaction feedback video, and so on. Such presentation controls may also be used by the system device 101 and/or one or more of the electronic devices 102A, 102B, 102N to synchronize the content and/or resynchronize the content when the content becomes unsynchronized. For example, when one of the electronic devices 102A, 102B, 102N is presenting the content at a lag compared to the others, the lagging device may skip presenting a portion of the content to catch up to the others. By way of another example, when one of the electronic devices 102A, 102B, 102N is presenting the content at a later portion compared to the others, the lagging device may pause presentation to allow the others to catch up. In some implementations, multiple solutions to synchronization mismatch may be evaluated to determine the resynchronization solution that will be least noticeable; least disruptive; require the least resources; involve resynchronization of the least number of electronic devices 102A, 102B, 102N; require the least network 110 communication; and so on. For example, fast forwarding may be used to catch a participant up to other participants when an amount of the content missed is below a time duration whereas the amount of content may instead be skipped to catch the participant up when the amount of content missed meets or exceeds the threshold. Such a determined solution may be the one used to resynchronize the content. Various configurations are possible and contemplated without departing from the scope of the present disclosure.

In some examples, the interaction feedback may be evaluated to determine whether or not the content presentation is mismatched and/or should be resynchronized. For example, an audio portion of the content may be identified in the interaction feedback audio (and/or a video portion of the content may be identified in the interaction feedback video); used to determine content presentation timing information for the respective location 103A, 103B, 103N; compared to main content timing information and/or timing information from the other locations 103A, 103B, 103N; and so on. If the timing differs, and/or differs more than a resynchronization threshold (which may prevent inefficient resynchronization for minor timing differences), the respective content presentation and/or all content presentation may be resynchronized.

In various implementations, various interaction feedback may be obtained and/or provided in various ways. For example, in some implementations, all obtained interaction feedback may be provided. The interaction feedback may be provided contemporaneous with the portion of the content that is associated with the interaction feedback (in other words, the portion of the content to which the interaction feedback was interacting). In other examples, all interaction feedback from other locations 103A, 103B, 103N may be provided without providing the interaction feedback from the respective location 103A, 103B, 103N. For example, a person's own interaction feedback audio may be omitted to avoid the perception of an echo. Alternatively, a person's own interaction feedback may be omitted in order to conserve resources since one's own interaction feedback may not be of interest.

In still other examples, an interaction feedback selection may be generated from amongst the available interaction feedback and then provided, which may be the same and/or different for different electronic devices 102A, 102B, 102N. For example, all interaction feedback may be provided when the combination is less than a sound threshold, but only a subset may be provided when the combination equals or exceeds the sound threshold. The sound threshold may be set corresponding to an audio level of the content. This may enable the individual interaction feedback in the interaction feedback selection to still be discernible without being too loud, drowning each other and/or the content out. In still other examples, a subset may be selected without regards to a sound threshold. Regardless, a subset may be selected using a variety of different factors, such as moderator choice; popularity ratings and/or other interest scores determined for the people 109A, 109B, 109N as previous interactors; interaction feedback audio levels; previous good behavior and/or misbehavior by the people 109A, 109B, 109N; a turn system (such as where one or more of the people 109A, 109B, 109N have the ability to communicate at a particular time and others have to wait their turn and/or have the ability to request a turn and so on); user input (such as by a moderator specifying which interaction feedback to include; a person 109A, 109B, 109N specifying which interaction feedback to include in their own user interface; and so on); monitoring indicates that interaction feedback has actually been provided (as opposed to providing blank monitored interaction feedback when the person 109A, 109B, 109N is not actually interacting); and so on.

By way of example of a turn system, one or more of the people 109A, 109B, 109N may be assigned a turn to speak and/or provide other interaction feedback. As such, other of the people 109A, 109B, 109N may be muted, but may provide an indication that they wish to speak and/or provide other interaction feedback (such as by providing user input, raising their hand and/or otherwise gesturing that may be recognized in interaction feedback video, speaking a command and/or otherwise speaking that may be recognized in interaction feedback audio, and so on). Turns may be time limited and/or otherwise ended when another person 109A, 109B, 109N has requested the ability to talk, voluntarily ceded, and so on. Various configurations are possible and contemplated without departing from the scope of the present disclosure.

Although the above describes synchronization of the content, the system 100 may additionally and/or alternatively synchronize presentation of the interaction feedback, such as synchronizing the interaction feedback (such as interaction feedback audio, interaction feedback video, both interaction feedback audio and video, and so on) presented by each device presenting such interaction feedback and/or synchronizing the interaction feedback with the content. This synchronized interaction feedback along with the synchronized content may further improve the shared content experience of the virtual room. For example, synchronizing interaction feedback may ensure that a person 109A, 109B, 109N sees the scary part of a movie without experiencing a lag in hearing one or more other of the people 109A, 109B, 109N scream in reaction to the scary part. By way of another example, synchronizing interaction feedback may ensure that a person 109A, 109B, 109N sees a big play of a sporting event without previously seeing one or more of the other people 109A, 109B, 109N jump up and begin cheering in reaction to the big play. In short, the system 100 may ensure that interactions are in sync with the content. By way of illustration, when smart phones and/or other electronic devices are used, the system 100 may ensure that reactions of the people 109A, 109B, 109N to the content and/or each other is captured in synch with the content and shared with the other people 109A, 109B, 109N in synch with the content in order to unify the experience. Various configurations are possible and contemplated without departing from the scope of the present disclosure.

Access to the virtual room may be controlled in a variety of ways. For example, receipt of an invitation may be required for access, subscription to a service may be required, access from a particular electronic device 102A, 102B, 102N and/or communication address of such may be required, access credentials (such as a log in and/or password, a code, a token, and so on) may be required, and so on. In some examples, access may be unlimited to service subscribers and prohibited and/or otherwise limited for non-subscribers. For example, non-subscribers may be able to access the virtual room for a limited period of time, access the virtual room upon payment of a fee and/or experiencing of an advertisement, access the virtual room to experience some content but not others, and so on. The virtual room may be used in some examples as an incentive to sign up non-subscribers for a subscription. Various configurations are possible and contemplated without departing from the scope of the present disclosure.

In some implementations, authorization to access the content presented via the virtual room may be determined. For example, the content may be obtained from a content provider and/or content source that restricts presentation to subscribers, particular locations 103A, 103B, 103N, to particular electronic devices 102A, 102B, 102N, and so on. In such situations, the system device 101 and/or the electronic devices 102A, 102B, 102N may verify authorization prior to presenting the content and/or allowing access to the virtual room. In some examples, access may be authorized to service subscribers and prohibited and/or otherwise limited for non-subscribers. For example, non-subscribers may be authorized to present content via the virtual room for a limited period of time, upon payment of a fee and/or experiencing of an advertisement, and so on. The virtual room may be used in some examples as an incentive to sign up non-subscribers for a subscription. Various configurations are possible and contemplated without departing from the scope of the present disclosure.

In various implementations, options for a particular virtual room may be configurable. The system device 101 and/or one or more of the electronic devices 102A, 102B, 102N may enable creation of a virtual room that is invitation only (and/or the ability to schedule dates and/or times, configure and/or receive reminder settings and/or notifications, and so on), open to the public and/or to a particular group, and so on. The system device 101 and/or one or more of the electronic devices 102A, 102B, 102N may enable searching of virtual rooms, joining of public and/or invited virtual rooms, and so on. The system device 101 and/or one or more of the electronic devices 102A, 102B, 102N may allow interaction feedback to be "open mic" such that everyone is presented interaction feedback from various participants (including reactions, such as screaming during a scary movie that a participant may or may not wish to hear), and/or allow one or more moderators and/or participants to screen out and/or otherwise be presented with some interaction feedback but not others. The system device 101 and/or one or more of the electronic devices 102A, 102B, 102N may allow all participants to control content presentation and/or restrict participant control in one or more ways. The system device 101 and/or one or more of the electronic devices 102A, 102B, 102N may present information regarding one or more content presentation controls that one or more of the participants has exercised so that participants may be able to see the control that has been exercised and/or who exercised such control.

In various examples, one or more moderators may be able to control one or more other participants and/or the access of such participants. For example, a moderator may be able to mute someone who is being excessively noisy, kick out someone who is causing a problem and/or ruining the experience for others, and so on. The moderator may be able to send invites to multiple people and/or perform other actions.

In some examples, the virtual room may be able to be configured in a "date night" and/or similar mode where the virtual room is operated as a closed session with limited access to the date and/or similar participants and/or other features that enable a more intimate connection. In a number of examples, the virtual room may be connected to an ordering service, such as a food delivery app, that coordinates delivery of food to the locations 103A, 103B, 103N with the content presentation.

In various examples, the people 109A, 109B, 109N may be able to use the virtual room to "like" and/or otherwise rate content, provide recommendations to each other, receive recommendations based on their participation and/or reactions, and so on. In some cases, the virtual room may be connected to social media and/or other systems, enabling the people 109A, 109B, 109N to indicate their participation in the virtual room (such as via a "status update"), which may enable others to reach out to the people 109A, 109B, 109N regarding their participation, to ask to join, and so on.

In a number of examples, the people 109A, 109B, 109N may be able to control the interaction feedback that is obtained from them. For example, the people 109A, 109B, 109N may be able to turn off and/or otherwise adjust audio, video, and/or other interaction feedback recorded from them. In some examples, the people 109A, 109B, 109N may set up one or more avatars and/or other representations of themselves, whether animated and/or still images, that may be presented on one or more displays instead of interaction feedback recorded of the people 109A, 109B, 109N. Various configurations are possible and contemplated without departing from the scope of the present disclosure.

Although the above is illustrated and described with respect to a particular configuration, it is understood that this is an example. In some implementations, other configurations are possible and contemplated without departing from the scope of the present disclosure.

For example, the above illustrates and describes the system device 101 communicating with the electronic devices 102A, 102B, 102N via the network 110. However, it is understood that this is an example. In some implementations, the system device 101 and/or the electronic devices 102A, 102B, 102N may configure communications directly between one or more of the electronic devices 102A, 102B, 102N (such as in a peer-to-peer and/or other configuration) and/or between one or more of the electronic devices 102A, 102B, 102N and/or another device. In some such implementations, the system device 101 may initiate communications directly between one or more of the electronic devices 102A, 102B, 102N and/or between one or more of the electronic devices 102A, 102B, 102N and/or another device, which may then communicate directly without further involvement by the system device 101. Various configurations are possible and contemplated without departing from the scope of the present disclosure.

Figure 2:
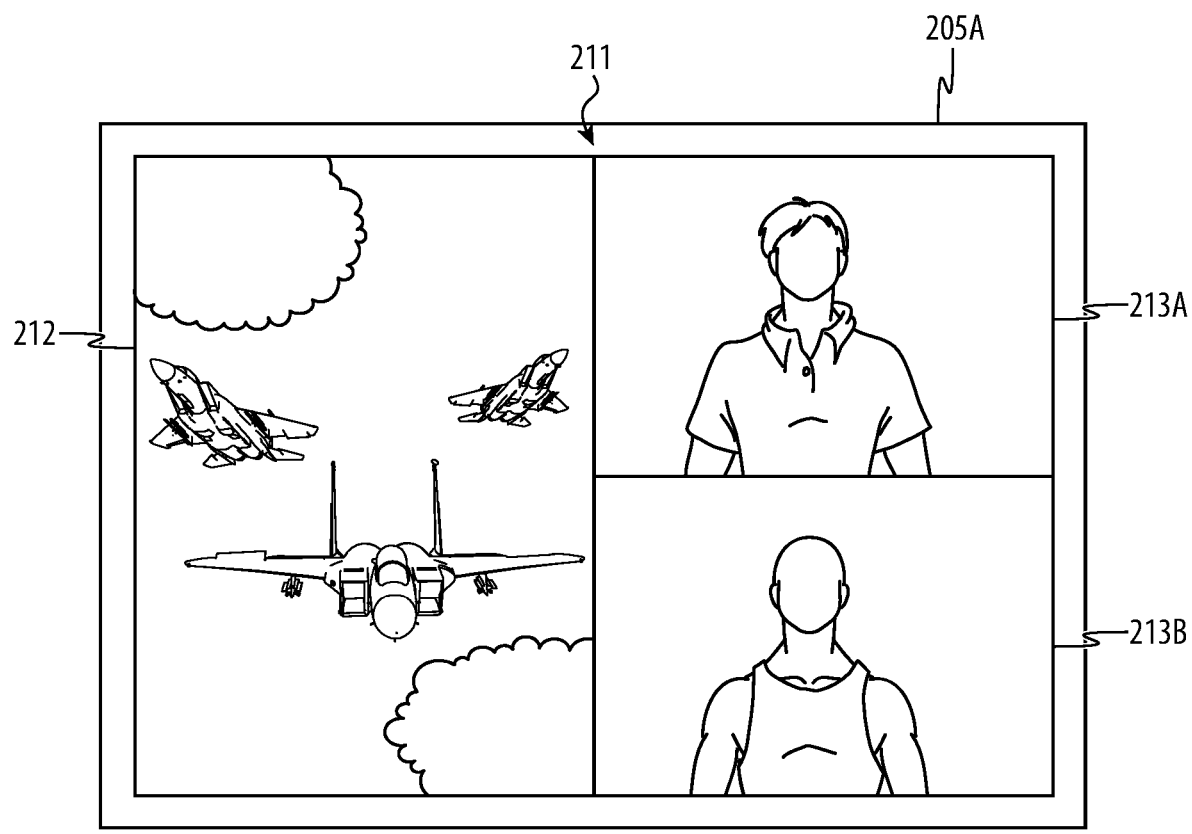
FIG. 2 depicts an example interface that may be provided by a system for providing remote shared content experiences. The interface may be provided by one or more of the systems of FIGS. 1, 3-4, and/or 10.

FIG. 2 depicts an example interface 211 that may be provided by a system for providing remote shared content experiences. The interface 211 may be provided by one or more of the systems 100, 300-400, 1000 of FIGS. 1, 3-4, and/or 10.

The interface 211 may be a user interface that includes a main content window 212 and one or more interaction feedback windows 213A, 213B. The user interface may be presented on a display 205A and/or other output device. The main content window 212 may present the content that is being presented and the interaction feedback windows 213A, 213B may include interaction feedback obtained from one or more participants, such as video captured of the participant reacting to the presented content. Various configurations are possible and contemplated without departing from the scope of the present disclosure.

Although the interface 211 illustrates and describes a particular configuration, it is understood that this is an example. In other implementations, other configurations are possible and contemplated without departing from the scope of the present disclosure. For example, in some implementations, the main content window 212 and one or more of the interaction feedback windows 213A, 213B may be presented via different displays 205A and/or other output devices. By way of another example, a different number of interaction feedback windows 213A, 213B (such as 1, 3, 10, and so on) may be presented. Various configurations are possible and contemplated without departing from the scope of the present disclosure.

Figure 3:
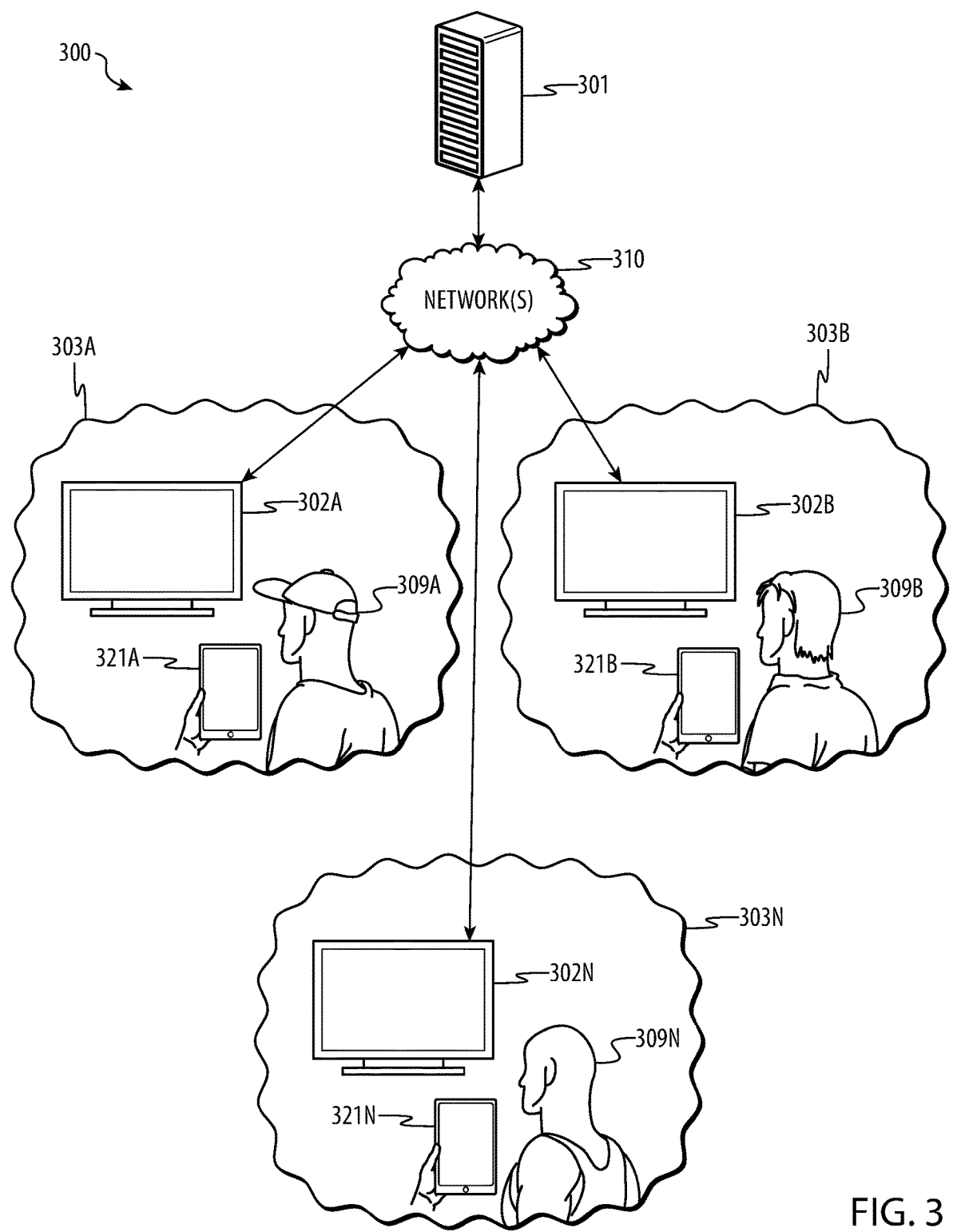
FIG. 3 depicts a second example system for providing remote shared content experiences.

FIG. 3 depicts a second example system 300 for providing remote shared content experiences. Similar to the system 100 of FIG. 1, the system 300 may include one or more system devices 301 that are operable to communicate with one or more electronic devices 302A, 302B, 302N, 321A, 321B, 321N at one or more different locations 303A, 303B, 303N via one or more networks 310 to provide remote shared content experiences to one or more people 309A, 309B, 309N. By way of contrast with the system 100 of FIG. 1, the system 300 may present one or more portions of content via a first of the electronic devices 302A, 302B, 302N and one or more portions of interaction feedback via a second of the electronic devices 321A, 321B, 321N. The respective content portions and interaction feedback portions may be received by different eyes and/or ears of the people 309A, 309B, 309N and/or received from different directions. This may better enable the people 309A, 309B, 309N to distinguish between the respective content portions and interaction feedback portions than if the two were received equally by the same eyes and/or ears and/or from the same direction and/or device. This may allow the people 309A, 309B, 309N to perceive and understand both without the respective content portions and interaction feedback portions interfering with each other, becoming muddled and/or otherwise indiscernible to the people 309A, 309B, 309N.

However, it is understood that this is an example. In other implementations, other configurations are possible and contemplated without departing from the scope of the present disclosure.

Figure 4:
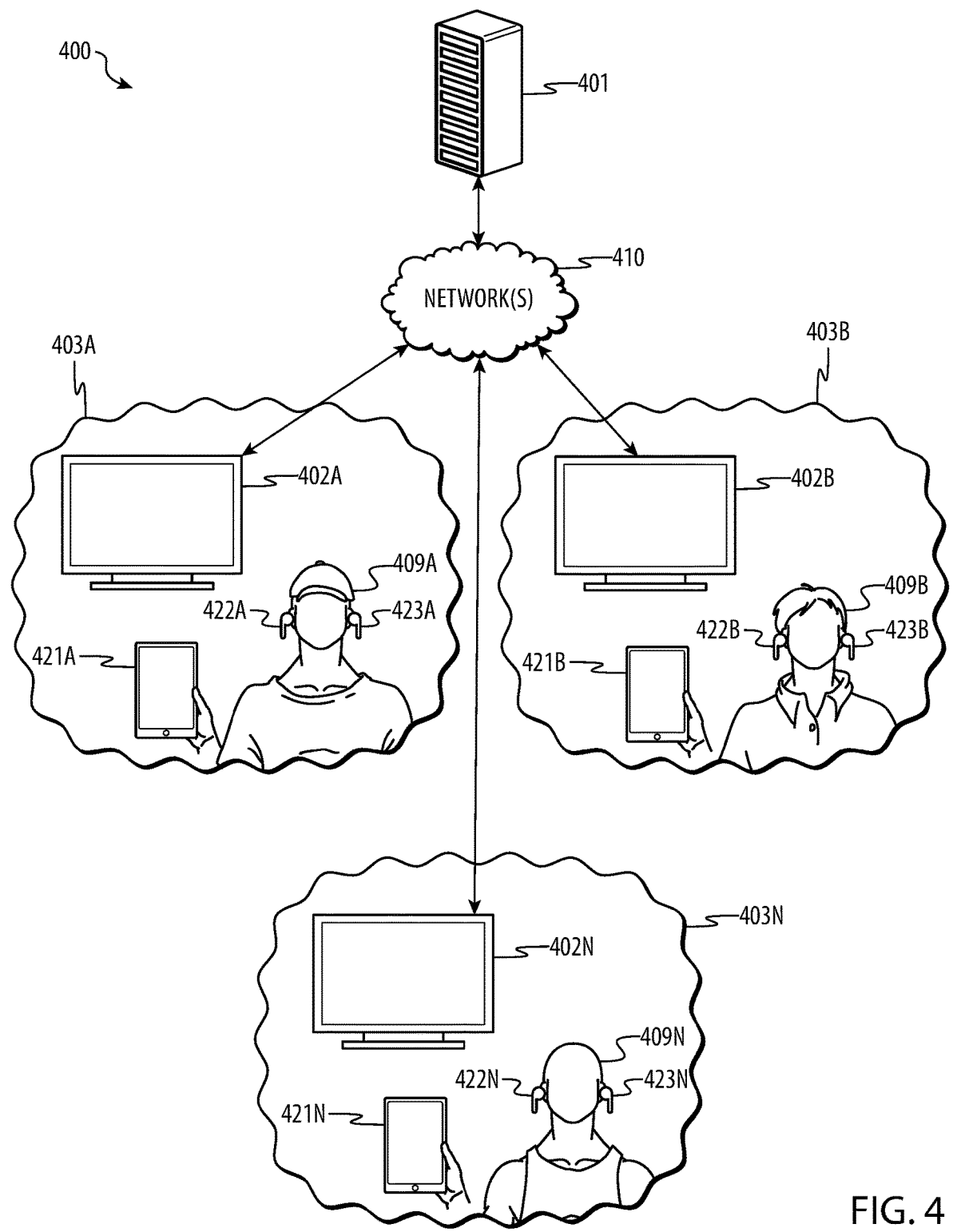
FIG. 4 depicts a third example system for providing remote shared content experiences.

For example, FIG. 4 depicts a third example system 400 for providing remote shared content experiences. Similar to the system 300 of FIG. 3, the system 400 may include one or more system devices 401 that are operable to communicate with one or more electronic devices 402A, 402B, 402N, 421A, 421B, 421N, 422A, 422B, 422N, 423A, 423B, 423N at one or more different locations 403A, 403B, 403N via one or more networks 410 to provide remote shared content experiences to one or more people 409A, 409B, 409N. By way of contrast with the system 300 of FIG. 3, the system 400 may present one or more audio portions of content via a first of the electronic devices 422A, 422B, 422N (which may be one or more left ear buds and/or other ear phones and/or other ear audio units of a pair of such ear buds and/or other ear phones and/or other ear audio units) and one or more portions of interaction feedback audio via a second of the electronic devices 423A, 423B, 423N (which may be one or more right ear buds and/or other ear phones and/or other ear audio units of a pair of such ear buds and/or other ear phones and/or other ear audio units). Alternatively, the positions of the first of the electronic devices 422A, 422B, 422N and the second of the electronic devices 423A, 423B, 423N may be reversed. This may better isolate the two audio portions from each other and may better enable the people 409A, 409B, 409N to distinguish between the two audio portions than if the two were not so isolated from each other. This may allow the people 409A, 409B, 409N to perceive and understand both without the two audio portions interfering with each other, becoming muddled and/or otherwise indiscernible to the people 409A, 409B, 409N.

However, it is understood that this is an example. In other implementations, other configurations are possible and contemplated without departing from the scope of the present disclosure. For example, in some implementations, the system 400 may present one or more audio portions of content via one or more of the electronic device 402A, 402B, 402N and/or the electronic devices 421A, 421B, 421N and one or more portions of interaction feedback audio via one or more of the electronic devices 422A, 422B, 422N, 423A, 423B, 423N (which may be one or more left and/or right ear buds and/or other ear phones and/or other ear audio units). For example, there may be only a single 422A, 422B, 422N, 423A, 423B, 423N instead of a pair as shown in FIG. 4.

Alternatively, in other implementations, the system 400 may present one or more audio portions of content via one or more of the electronic devices 422A, 422B, 422N, 423A, 423B, 423N (which may be one or more left and/or right ear buds and/or other ear phones and/or other ear audio units) and one or more portions of interaction feedback audio via one or more of the electronic devices 402A, 402B, 402N and/or the electronic devices 421A, 421B, 421N. Again, there may be only a single 422A, 422B, 422N, 423A, 423B, 423N instead of a pair as shown in FIG. 4. Various configurations are possible and contemplated without departing from the scope of the present disclosure.

Additionally, although FIG. 4 is illustrated and described in the context of pairs of ear buds and/or other ear phones and/or other ear audio units, it is understood that this is an example. In other implementations, a single ear bud and/or ear phone and/or other ear audio unit may be used. For example, a single ear bud and/or ear phone and/or other ear audio unit may be used with a first ear to present one or more portions of interaction feedback audio while the other ear (the one without an ear bud and/or ear phone and/or other ear audio unit) may be left open to listen to the environment, including one or more televisions and/or other electronic devices in the environment used to play the content. Various configurations are possible and contemplated without departing from the scope of the present disclosure.

Figure 5:
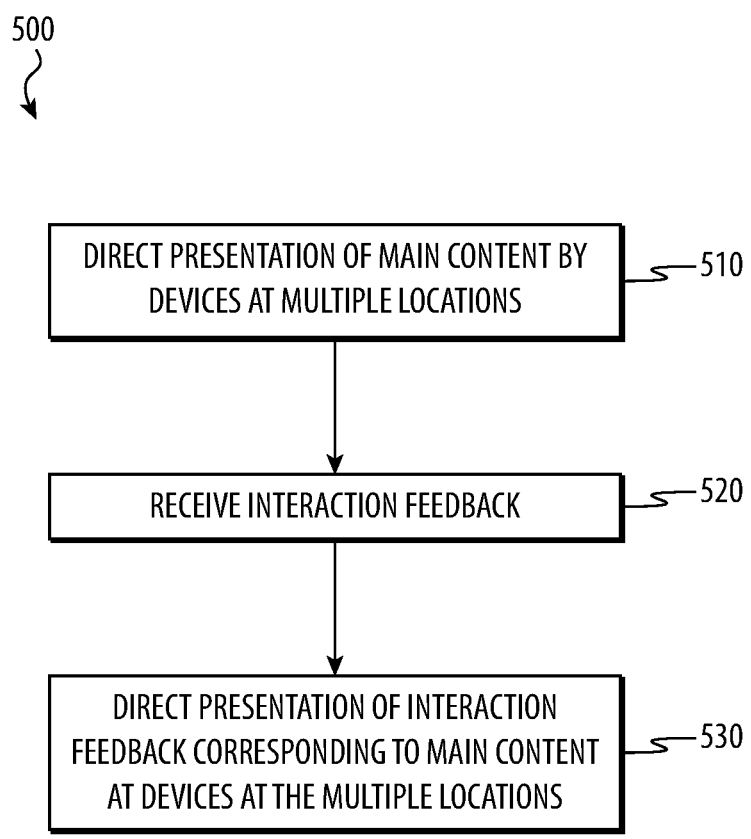
FIG. 5 depicts a flow chart illustrating a first example method for providing remote shared content experiences. This method may be performed by one or more of the systems of FIGS. 1, 3-4, and/or 10.

FIG. 5 depicts a flow chart illustrating a first example method 500 for providing remote shared content experiences. This method 500 may be performed by one or more of the systems 100, 300, 400, 1000 of FIGS. 1, 3-4, and/or 10.

At operation 510, an electronic device (such as one or more of the system devices 101, 301, 401, 1001 of FIGS. 1, 3-4, and/or 10) may direct presentation of a main content by devices at multiple locations. The devices may be one or more of the electronic devices 102A, 102B, 102N, 302A, 302B, 302N, 321A, 321B, 321N, 402A, 402B, 402N, 421A, 421B, 421N, 422A, 422B, 422N, 423A, 423B, 423N, 1002 of FIGS. 1, 3-4, and/or 10. Directing presentation of the main content may include directing presentation of the entirety of the main content, a portion and/or component thereof, and so on. The electronic device may direct the presentation of the main content as part of providing access to one or more virtual rooms that provide remote shared content experiences as discussed above. The main content may include broadcast content (such as broadcast television programs, sporting events, movies, and so on), on demand and/or other recorded content, video games, music and/or other audio, still images, and so on. The electronic device may be operable to synchronize presentation of the main content by the devices at the multiple locations, control the presentation in response to one or more communications received via one or more of the devices, and so on.

At operation 520, the electronic device may receive interaction feedback. The interaction feedback may be associated with the main content. The interaction feedback may include video, audio, images, user input, text, and/or other data related to people reacting to the main content, communicating with each other while experiencing the main content, and so on.

At operation 530, the electronic device may direct presentation of at least a portion of the interaction feedback corresponding to the main content at one or more of the devices at the multiple locations. The interaction feedback may correspond to particular portions of the main content. The electronic device may direct presentation of one or more portions of the interaction feedback with the corresponding portions of the main content.

In various examples, this example method 500 may be implemented as a group of interrelated software modules or components that perform various functions discussed herein. These software modules or components may be executed within a cloud network and/or by one or more computing devices, such as the system device 101 of FIG. 1.

Although the example method 500 is illustrated and described as including particular operations performed in a particular order, it is understood that this is an example. In various implementations, various orders of the same, similar, and/or different operations may be performed without departing from the scope of the present disclosure.

For example, the method 500 is illustrated and described as direct presentation of the main content and the interaction feedback. This may include transmitting the main content and/or the interaction feedback to the devices, controlling presentation of the main content and/or the interaction feedback by the devices, instructing the devices regarding presentation of the main content and/or the interaction feedback by the devices, and so on. Various configurations are possible and contemplated without departing from the scope of the present disclosure.

Figure 6:
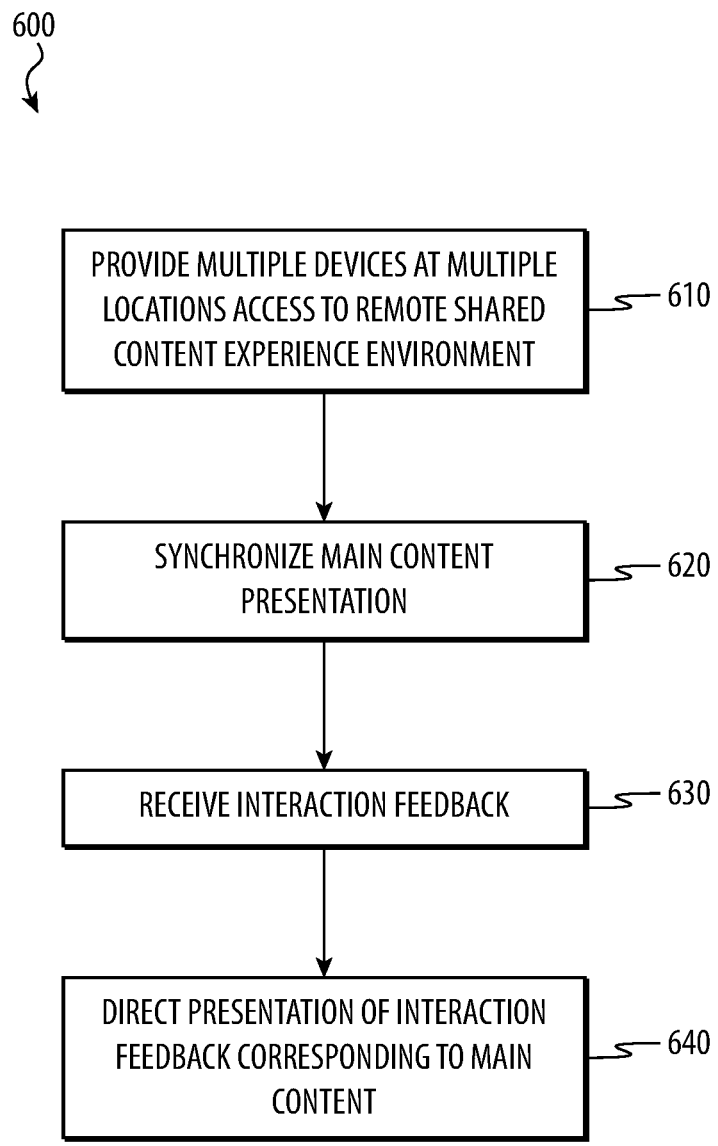
FIG. 6 depicts a flow chart illustrating a second example method for providing remote shared content experiences. This method may be performed by one or more of the systems of FIGS. 1, 3-4, and/or 10.

FIG. 6 depicts a flow chart illustrating a second example method 600 for providing remote shared content experiences. This method 600 may be performed by one or more of the systems 100, 300-400, 1000 of FIGS. 1, 3-4, and/or 10.

At operation 610, an electronic device (such as one or more of the system devices 101, 301, 401, 1001 of FIGS. 1, 3-4, and/or 10) may provide multiple devices at multiple locations access to a remote shared content experience environment. The remote shared content experience environment may include the ability to control and/or access presentation of a main content in a uniform and/or substantially uniform fashion for all of the devices, interact with other participants via one or more of the multiple devices, and so on.

At operation 620, the electronic device may synchronize main content presentation across the multiple devices. The content may be synchronized using one or more system clocks, time stamps associated with the content, synchronization data structures, feedback mechanisms, and so on.

At operation 630, the electronic device may receive interaction feedback from one or more participants via one or more of the multiple devices and/or other electronic devices at one or more of the multiple locations. The interaction feedback may include video, audio, images, user input, text, and/or other data related to people reacting to the main content, communicating with each other while experiencing the main content, and so on.

At operation 640, the electronic device may direct presentation of at least a portion of the interaction feedback corresponding to the main content. The electronic device may direct presentation by one or more of the multiple devices and/or one or more other electronic devices at one or more of the multiple locations. In some implementations, all obtained interaction feedback may be provided. The interaction feedback may be provided contemporaneous with the portion of the content that is associated with the interaction feedback (in other words, the portion of the content to which the interaction feedback was interacting). In other examples, all interaction feedback from other locations may be provided at a respective location without providing the interaction feedback from the respective location. This may avoid the perception of an echo, in order to conserve resources since one's own interaction feedback may not be of interest, and so on.

In various examples, the interaction feedback may be evaluated to determine whether or not the content presentation is mismatched and/or should be resynchronized. For example, an audio portion of the main content may be identified in interaction feedback audio (and/or a video portion of the main content may be identified in interaction feedback video), used to determine main content presentation timing information for the respective location, compared to main content timing information and/or timing information from the other locations; and so on. If the timing differs, and/or differs more than a resynchronization threshold (which may prevent inefficient resynchronization for minor timing differences), the respective main content presentation and/or all main content presentation may be resynchronized.

In various examples, this example method 600 may be implemented as a group of interrelated software modules or components that perform various functions discussed herein. These software modules or components may be executed within a cloud network and/or by one or more computing devices, such as the system device 101 of FIG. 1.

Although the example method 600 is illustrated and described as including particular operations performed in a particular order, it is understood that this is an example. In various implementations, various orders of the same, similar, and/or different operations may be performed without departing from the scope of the present disclosure.

For example, the method 600 is illustrated and described as directing presentation of the interaction feedback. However, it is understood that this is an example. In some implementations, obtained interaction feedback may be presented by one or more electronic devices at one or more of the multiple locations without any direction from the electronic device. Various configurations are possible and contemplated without departing from the scope of the present disclosure.

Figure 7:
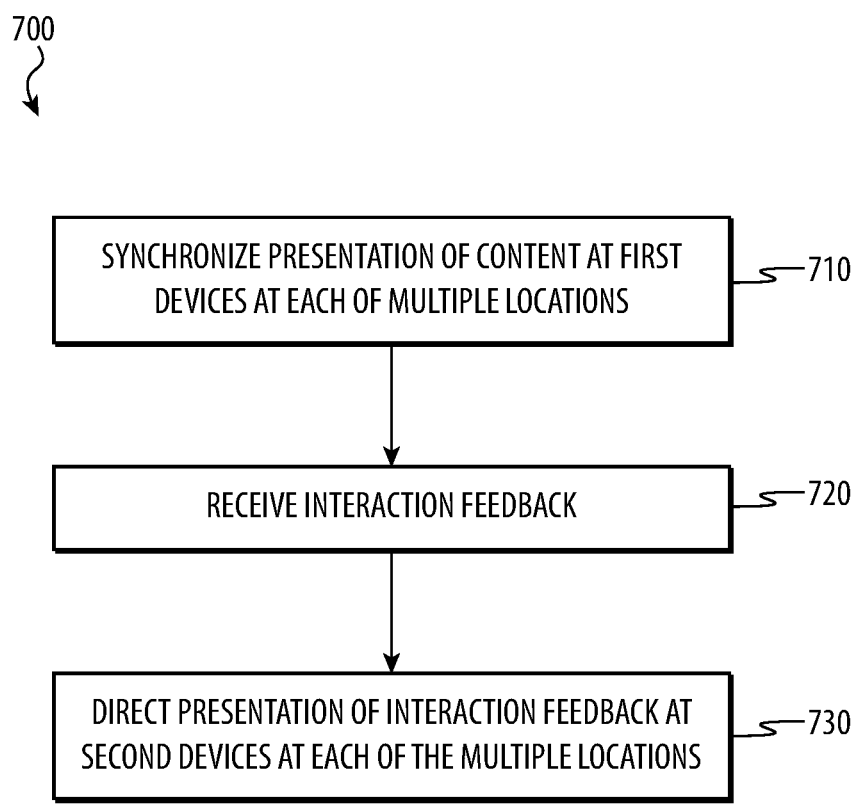
FIG. 7 depicts a flow chart illustrating a third example method for providing remote shared content experiences. This method may be performed by one or more of the systems of FIGS. 1, 3-4, and/or 10.

FIG. 7 depicts a flow chart illustrating a third example method 700 for providing remote shared content experiences. This method 700 may be performed by one or more of the systems 100, 300-400, 1000 of FIGS. 1, 3-4, and/or 10.

At operation 710, an electronic device (such as one or more of the system devices 101, 301, 401, 1001 of FIGS. 1, 3-4, and/or 10) may synchronize presentation of at least a portion of content at first devices at each of multiple locations. At operation 720, the electronic device may receive interaction feedback associated with the content. At operation 730, the electronic device may direct presentation of at least a portion of the interaction feedback at second devices at each of the multiple locations.

For example, in some implementations, the first devices may be televisions and/or other displays with one or more speakers and/or other audio output devices that output an audio portion of the content and the second devices may be mobile computing devices with one or more speakers and/or other audio output devices that output an audio portion of the interaction feedback. Output of the audio portion of the content and the audio portion of the interaction feedback may result in the different audio portions being received by different ears of the people and/or received from different directions. This may enable the people to be better able to distinguish between the audio portion of the content and the interaction feedback audio than if the two were received equally by the same ears and/or from the same direction. This may allow the people to perceive and understand both without the different audio portions interfering with each other, becoming muddled and/or otherwise indiscernible to the people.

In various other implementations, the first devices may be first audio output devices and the second devices may be second audio output devices, such as left and right speakers and/or other audio output devices, left and right ear buds and/or ear phones of a pair of ear buds and/or ear phones, and so on.

In various examples, this example method 700 may be implemented as a group of interrelated software modules or components that perform various functions discussed herein. These software modules or components may be executed within a cloud network and/or by one or more computing devices, such as the system device 101 of FIG. 1.

Although the example method 700 is illustrated and described as including particular operations performed in a particular order, it is understood that this is an example. In various implementations, various orders of the same, similar, and/or different operations may be performed without departing from the scope of the present disclosure.

For example, the method 700 is illustrated and described as the electronic device synchronizing the presentation of the content. However, it is understood that this is an example. In some implementations, the electronic device may instruct the first devices to begin presentation of the content at the same time and/or substantially the same time without any additional synchronization, may omit synchronizing the content, and so on. Various configurations are possible and contemplated without departing from the scope of the present disclosure.

In various implementations, a system for providing remote shared content experiences may include a communication unit, a non-transitory storage medium that stores instructions, and a processor. The processor may execute the instructions to synchronize presentation of at least part of a main content by at least one first electronic device at a first location and at least one second electronic device at a second location; receive first location interaction feedback, via the communication unit, from the first location that is associated with the presentation of the at least part of the main content by the at least one first electronic device; receive second location interaction feedback, via the communication unit, from the second location that is associated with the presentation of the at least part of the main content by the at least one second electronic device; and direct presentation of the first location interaction feedback at the first location by at least one third electronic device.

In some examples, the at least one first electronic device may be a display and the at least one third electronic device may be a mobile computing device. In various examples, the at least one first electronic device may be a first audio output device and the at least one third electronic device may be a second audio output device. In some such examples, the first audio output device may be a first ear phone or ear bud and the second audio output device may be a second ear phone or ear bud.

In a number of examples, the processor may synchronize presentation of the first location interaction feedback with presentation of the at least part of the main content. In some examples, the processor may receive the first location interaction feedback from the at least one first electronic device. In various examples, the processor may receive the first location interaction feedback from the at least one third electronic device.

Figure 8:
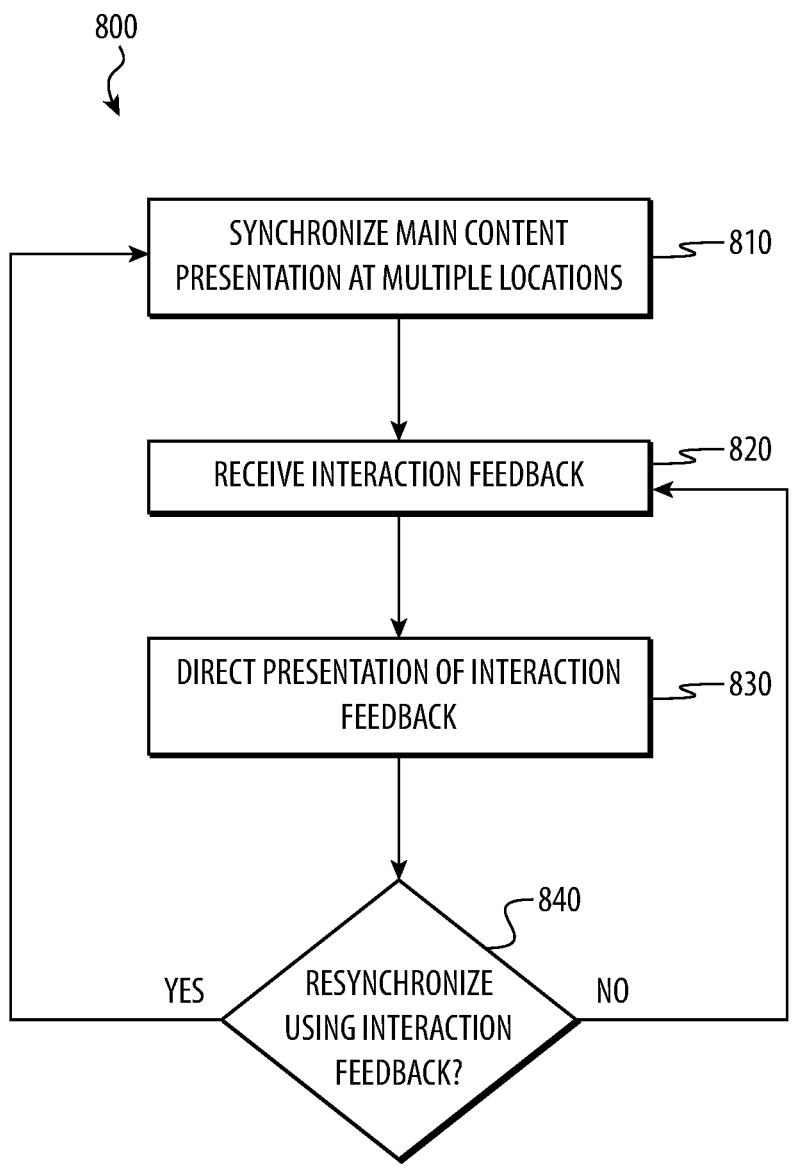
FIG. 8 depicts a flow chart illustrating a fourth example method for providing remote shared content experiences. This method may be performed by one or more of the systems of FIGS. 1, 3-4, and/or 10.

FIG. 8 depicts a flow chart illustrating a fourth example method 800 for providing remote shared content experiences. This method 800 may be performed by one or more of the systems of FIGS. 1, 3-4, and/or 10.

At operation 810, an electronic device (such as one or more of the system devices 101, 301, 401, 1001 of FIGS. 1, 3-4, and/or 10) may synchronize presentation of a main content at multiple locations. At operation 820, the electronic device may receive interaction feedback associated with the main content. At operation 830, the electronic device may direct presentation of at least a portion of the interaction feedback at one or more of the multiple locations.

At operation 840, the electronic device may evaluate the interaction feedback to determine whether or not to resynchronize presentation of the main content at one or more of the multiple locations. If so, the flow may proceed to operation 810 where the electronic device may resynchronize presentation of the main content at one or more of the multiple locations. Otherwise, the flow may proceed to operation 820 where the electronic device may continue to receive interaction feedback associated with the main content.

For example, the main content may be identified in first location interaction feedback and first location interaction feedback timing may be compared to main content timing. If the first location interaction feedback timing differs from the main content timing, and/or differs more than a resynchronization threshold (which may prevent inefficient resynchronization for minor timing differences), the respective main content presentation and/or all main content presentation may be resynchronized. In some examples, the first location interaction feedback may include audio. In other examples, the first location interaction feedback may include video.

In another example, first location interaction feedback from a first location may be compared to second location interaction feedback from a second location. The first location interaction feedback and the second location interaction feedback may be captured contemporaneously and/or otherwise correspond to each other. If the first location interaction feedback differs from the location interaction feedback, and/or differs more than a resynchronization threshold (which may prevent inefficient resynchronization for minor timing differences), the respective main content presentation at the first location and/or the second location and/or all main content presentation may be resynchronized.

In some implementations of such examples, one or more portions of the first location interaction feedback that are missing from the second location interaction feedback (and/or one or more portions of the second location interaction feedback that are missing from the first location interaction feedback) may be removed. For example, the first location interaction feedback and the second location interaction feedback may both include one or more video, audio, and/or other portions of the main content, but each may include interaction feedback that is missing from the other. This individual interaction feedback may be removed from the respective location interaction feedback in order to make comparison of the first location interaction feedback and the second location interaction feedback less complex, more efficient, consume less hardware and/or software resources, and so on.

By way of still another example, an audio portion of the main content may be identified in interaction feedback audio (and/or a video portion of the main content may be identified in interaction feedback video), used to determine main content presentation timing information for the respective location, compared to main content timing information and/or timing information from the other locations; and so on. If the timing differs, and/or differs more than a resynchronization threshold (which may prevent inefficient resynchronization for minor timing differences), the respective main content presentation and/or all main content presentation may be resynchronized.

In various examples, this example method 800 may be implemented as a group of interrelated software modules or components that perform various functions discussed herein. These software modules or components may be executed within a cloud network and/or by one or more computing devices, such as the system device 101 of FIG. 1.

Although the example method 800 is illustrated and described as including particular operations performed in a particular order, it is understood that this is an example. In various implementations, various orders of the same, similar, and/or different operations may be performed without departing from the scope of the present disclosure.

For example, the method 800 is illustrated and described as determining whether or not to resynchronize presentation of the main content based on evaluation of interaction feedback. However, it is understood that this is an example. In other implementations, the electronic device may determine whether or not to resynchronize the main content according to other factors, such as comparing timing information, evaluating synchronization data structures, and so on. Various configurations are possible and contemplated without departing from the scope of the present disclosure.

In some implementations, a system for providing remote shared content experiences may include a communication unit, a non-transitory storage medium that stores instructions, and a processor. The processor may execute the instructions to synchronize presentation of a main content by at least one first electronic device at a first location and at least one second electronic device at a second location; receive first location interaction feedback, via the communication unit, from the first location that is associated with the presentation of the main content by the at least one first electronic device; receive second location interaction feedback, via the communication unit, from the second location that is associated with the presentation of the main content by the at least one second electronic device; direct presentation of the first location interaction feedback at the first location by the at least one first electronic device; and determine whether to resynchronize the presentation of the main content by the first electronic device and the second electronic device using the first location interaction feedback or the second location interaction feedback.

In various examples, the processor may determine whether to resynchronize the presentation of the main content by identifying the main content in the first location interaction feedback and comparing first location interaction feedback timing with main content timing. In some such examples, the processor may determine to resynchronize presentation of the main content when the first location interaction feedback timing differs from the main content timing more than a resynchronization threshold. In various such examples, the first location interaction feedback may include audio. In a number of such examples, the first location interaction feedback may include video.

In some examples, the processor may determine whether to resynchronize the presentation of the main content by comparing the first location interaction feedback to the second location interaction feedback. In various such examples, the processor may remove a portion of the first location interaction feedback that is missing from the second location interaction feedback.

Figure 9:
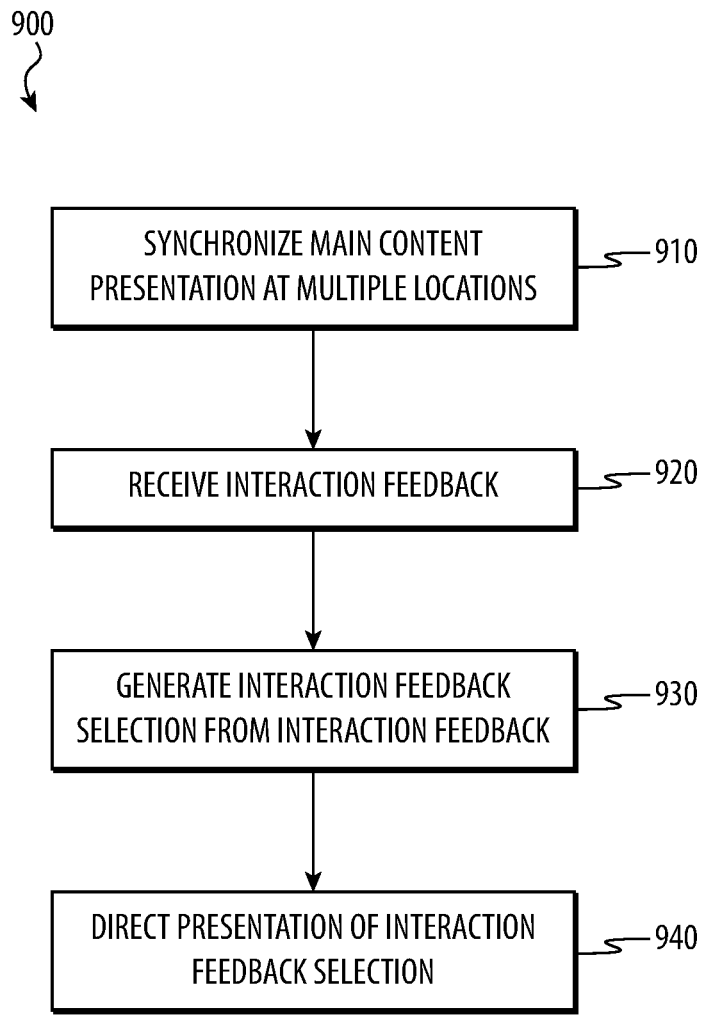
FIG. 9 depicts a flow chart illustrating a fifth example method for providing remote shared content experiences. This method may be performed by one or more of the systems of FIGS. 1, 3-4, and/or 10.

FIG. 9 depicts a flow chart illustrating a fifth example method 900 for providing remote shared content experiences. This method 900 may be performed by one or more of the systems 100, 300-400, 1000 of FIGS. 1, 3-4, and/or 10.

At operation 910, an electronic device (such as one or more of the system devices 101, 301, 401, 1001 of FIGS. 1, 3-4, and/or 10) may synchronize main content presentation at multiple locations. At operation 920, the electronic device may receive interaction feedback associated with the main content presentation. At operation 930, the electronic device may generate an interaction feedback selection from the received interaction feedback. At operation 940, the electronic device may direct presentation of the interaction feedback selection at one or more of the multiple locations.

In various examples, the interaction feedback selection may be generated from amongst the available interaction feedback and then provided, which may be the same and/or different for different of the multiple locations. For example, all interaction feedback may be provided when the combination is less than a sound threshold, but only a subset may be provided when the combination equals or exceeds the sound threshold. The sound threshold may be set corresponding to an audio level of the main content. This may enable the individual interaction feedback in the interaction feedback selection to still be discernible without being too loud, drowning each other and/or the content out. In still other examples, a subset may be selected without regards to a sound threshold. Regardless, a subset may be selected using a variety of different factors, such as moderator choice; popularity ratings and/or other interest scores determined for the different participants as previous interactors; interaction feedback audio levels; previous good behavior and/or misbehavior by the different participants; a turn system (such as where one or more of the participants have the ability to communicate at a particular time and others have to wait their turn and/or have the ability to request a turn and so on); user input (such as by a moderator specifying which interaction feedback to include; a participant specifying which interaction feedback to include in their own user interface; and so on); monitoring indicates that interaction feedback has actually been provided (as opposed to providing blank monitored interaction feedback when a participant is not actually interacting); and so on.

In various examples, this example method 900 may be implemented as a group of interrelated software modules or components that perform various functions discussed herein. These software modules or components may be executed within a cloud network and/or by one or more computing devices, such as the system device 101 of FIG. 1.

Although the example method 900 is illustrated and described as including particular operations performed in a particular order, it is understood that this is an example. In various implementations, various orders of the same, similar, and/or different operations may be performed without departing from the scope of the present disclosure.

For example, the method 900 illustrates and describes the electronic device receiving the interaction feedback. However, in some examples, the electronic device may direct one or more other electronic devices to generate the interaction feedback selection without the electronic device receiving the interaction feedback. Various configurations are possible and contemplated without departing from the scope of the present disclosure.

In a number of implementations, a system for providing remote shared content experiences may include a communication unit, a non-transitory storage medium that stores instructions, and a processor. The processor may execute the instructions to synchronize presentation of a main content by a first electronic device at a first location, a second electronic device at a second location, and a third electronic device at a third location; receive first location interaction feedback, via the communication unit, from the first location that is associated with the presentation of the main content by the first electronic device; receive second location interaction feedback, via the communication unit, from the second location that is associated with the presentation of the main content by the second electronic device; receive third location interaction feedback, via the communication unit, from the third location that is associated with the presentation of the main content by the third electronic device; generate an interaction feedback selection for the first location from the second location interaction feedback and the third location interaction feedback; and direct presentation of the interaction feedback selection at the first location by the first electronic device.

In various examples, the processor may determine that a combination of the second location interaction feedback and the third location interaction feedback is less than a sound threshold and generate the interaction feedback selection by combining the second location interaction feedback and the third location interaction feedback. In some examples, the processor may determine that a combination of the second location interaction feedback and the third location interaction feedback equals or exceeds a sound threshold and generate the interaction feedback selection using one of the second location interaction feedback and the third location interaction feedback. In various such examples, the processor may determine the sound threshold based on an audio level of the main content.

In some examples, the processor may evaluate previous interaction feedback to determine interest scores associated with previous interactors and generate the interaction feedback selection by selecting between the second location interaction feedback and the third location interaction feedback using the interest scores. In a number or examples, the processor may receive user input from the first electronic device and generate the interaction feedback selection using the user input.

Figure 10:
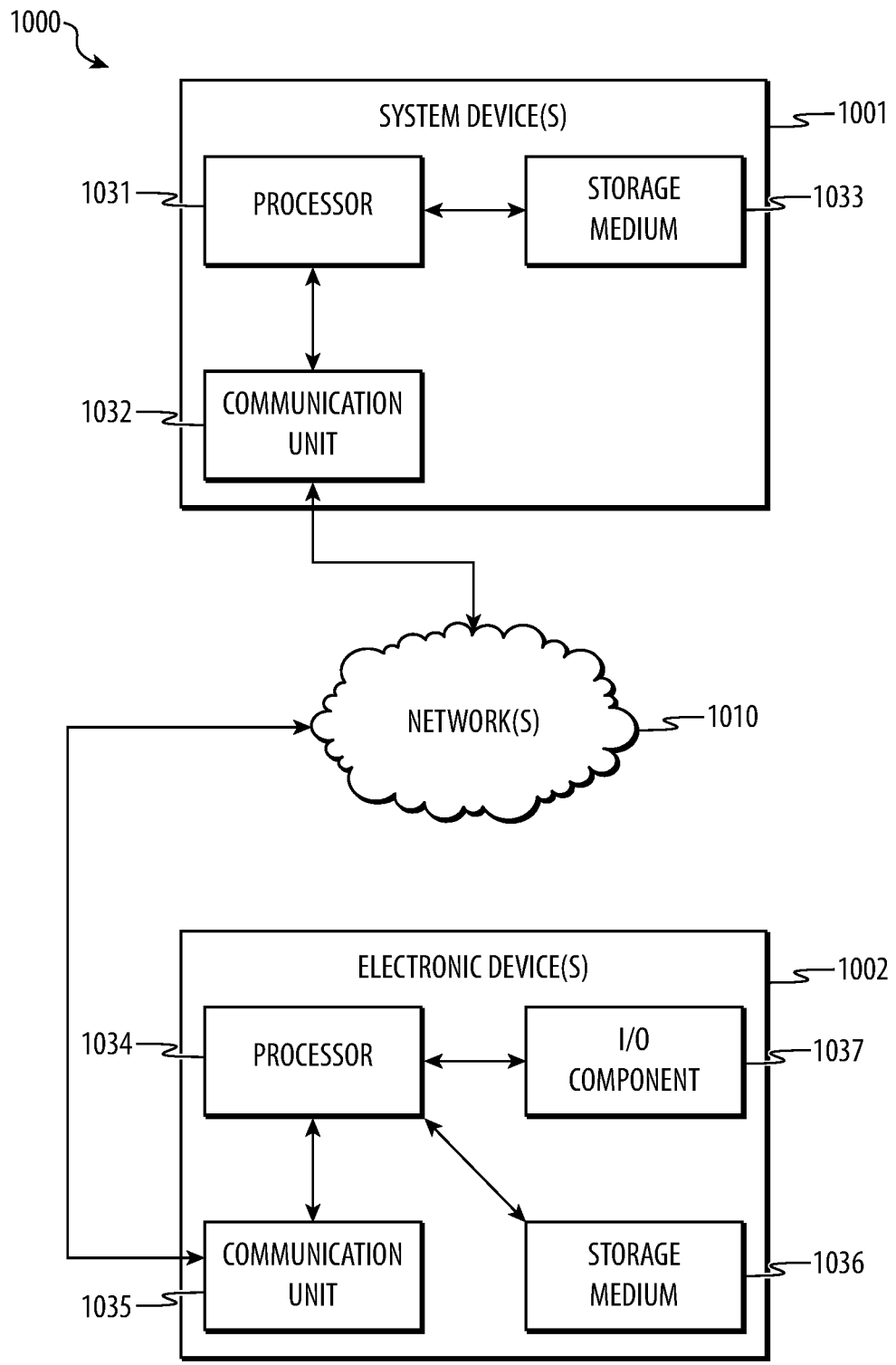
FIG. 10 depicts an example system of components that may be used to implement a system for providing remote shared content experiences. The system may be one or more of the systems of FIGS. 1, 3-4, and/or 10.

FIG. 10 depicts an example system 1000 of components that may be used to implement a system for providing remote shared content experiences. The system 1000 may be one or more of the systems 100, 300-400, 1000 of FIGS. 1, 3-4, and/or 10. The system 1000 may include one or more system devices 1001 that are operable to communicate with one or more electronic devices 1002 via one or more communication networks 1010.

The system device 1001 may be any kind of electronic device. Examples of such devices include, but are not limited to, one or more desktop computing devices, laptop computing devices, server computing devices, mobile computing devices, tablet computing devices, set top boxes, digital video recorders, televisions, displays, audio devices, ear buds and/or ear phones, wearable devices, smart phones, set top boxes, digital media players, and so on. The system device 1001 may include one or more processors 1031 and/or other processing units and/or controllers, one or more non-transitory storage media 1033 (which may take the form of, but is not limited to, a magnetic storage medium; optical storage medium; magneto-optical storage medium; read only memory; random access memory; erasable programmable memory; flash memory; and so on), one or more communication units 1032, and/or other components. The processor 1031 may execute instructions stored in the non-transitory storage medium 1033 to perform various functions. Such functions may include one or more of the functions discussed above with respect to methods 500, 600, 700, 800, and/or 900 of FIGS. 5-9, synchronizing content, providing access to one or more virtual rooms, receiving interaction feedback, directing presentation of interaction feedback, communicating with the electronic device 1002 via the network 1010 using the communication unit 1032, and so on.

Similarly, the electronic device 1002 may be any kind of electronic device and may include one or more processors 1034 and/or other processing units and/or controllers, one or more non-transitory storage media 1036, one or more communication units 1035, one or more input and/or output components 1037 (such as one or more displays, speakers and/or other audio output components, touch screens, track pads, buttons, touch sensors, capacitive sensors, printers, microphones, cameras and/or other image sensors, and so on), and/or other components. The processor 1034 may execute instructions stored in the non-transitory storage medium 1036 to perform various functions. Such functions may include one or more of the functions discussed above with respect to methods 500, 600, 700, 800, and/or 900 of FIGS. 5-9, presenting content, capturing interaction feedback, obtaining input and/or other data via the input and/or output component 1037, presenting interaction feedback, accessing one or more virtual rooms, communicating with the system device 1001 via the network 1010 using the communication unit 1035, and so on.

Although the system 1000 is illustrated and described as including particular components arranged in a particular configuration, it is understood that this is an example. In a number of implementations, various configurations of various components may be used without departing from the scope of the present disclosure.

For example, the system 1000 is illustrated and described as the system device 1001 communicating with the electronic device 1002 via the network 1010. However, it is understood that this is an example. In some implementations, the system device 1001 may directly communicate with the electronic device 1002 outside of any network 1010. Various configurations are possible and contemplated without departing from the scope of the present disclosure.

As described above and illustrated in the accompanying figures, the present disclosure relates to providing remote shared content experiences. A system may provide a virtual room for remotely sharing content experiences via electronic devices at different locations. The system may enable synchronization of the content at the different locations, access control, be able to provide and/or experience interaction feedback regarding the content, control the interaction feedback that is provided and/or experienced, enhance the ability of people to distinguish the content from the interaction feedback, and so on. As such, people may be able to share content experiences more like they were present in a single location while remote from each other.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A system for providing remote shared content experiences, comprising:
a communication unit;
a non-transitory storage medium that stores instructions; and
a processor that executes the instructions to:
synchronize presentation of at least part of a main content including main content audio by at least one first electronic device at a first location and at least one second electronic device at a second location;
receive first location interaction feedback, via the communication unit, from the first location that is associated with the presentation of the at least part of the main content by the at least one first electronic device;
receive second location interaction feedback, via the communication unit, from the second location that is associated with the presentation of the at least part of the main content by the at least one second electronic device; and
communicate with at least one third electronic device to cause presentation of the second location interaction feedback including feedback audio at the first location by the at least one third electronic device, the at least one third electronic device is separate from the at least one first electronic device.

2. The system of claim 1, wherein:
the at least one first electronic device is a display; and
the at least one third electronic device is a mobile computing device.

3. The system of claim 1, wherein:
the at least one first electronic device is a first audio output device; and
the at least one third electronic device is a second audio output device.

4. The system of claim 3, wherein:
the first audio output device is a first ear phone or ear bud; and
the second audio output device is a second ear phone or ear bud.

5. The system of claim 1, wherein the processor synchronizes presentation of the first location interaction feedback with the presentation of the at least part of the main content.

6. The system of claim 1, wherein the processor receives the first location interaction feedback from the at least one first electronic device.

7. The system of claim 1, wherein the processor receives the first location interaction feedback from the at least one third electronic device.

8. A system for providing remote shared content experiences, comprising:
a communication unit;
a non-transitory storage medium that stores instructions; and
a processor that executes the instructions to:
synchronize presentation of a main content by at least one first electronic device at a first location and at least one second electronic device at a second location;
receive first location interaction feedback, via the communication unit, from the first location that is associated with the presentation of the main content by the at least one first electronic device;
receive second location interaction feedback, via the communication unit, from the second location that is associated with the presentation of the main content by the at least one second electronic device;
communicate with the at least one first electronic device to cause presentation of the second location interaction feedback at the first location by the at least one first electronic device; and
determine whether to resynchronize the presentation of the main content by the at least one first electronic device and the at least one second electronic device using feedback audio included in the first location interaction feedback or the second location interaction feedback.

9. The system of claim 8, wherein the processor determines whether to resynchronize the presentation of the main content by:
identifying the main content in the first location interaction feedback; and
comparing first location interaction feedback timing with main content timing.

10. The system of claim 9, wherein the processor determines to resynchronize the presentation of the main content when the first location interaction feedback timing differs from the main content timing more than a resynchronization threshold.

11. The system of claim 9, wherein the first location interaction feedback comprises audio.

12. The system of claim 9, wherein the first location interaction feedback comprises video.

13. The system of claim 8, wherein the processor determines whether to resynchronize the presentation of the main content by comparing the first location interaction feedback to the second location interaction feedback.

14. The system of claim 13, wherein the processor removes a portion of the first location interaction feedback that is missing from the second location interaction feedback.

15. A system for providing remote shared content experiences, comprising:
a communication unit;
a non-transitory storage medium that stores instructions; and
a processor that executes the instructions to:
synchronize presentation of a main content including main content audio by a first electronic device at a first location, a second electronic device at a second location, and a third electronic device at a third location;
receive first location interaction feedback, via the communication unit, from the first location that is associated with the presentation of the main content by the first electronic device;
receive second location interaction feedback, via the communication unit, from the second location that is associated with the presentation of the main content by the second electronic device;
receive third location interaction feedback, via the communication unit, from the third location that is associated with the presentation of the main content by the third electronic device;
generate an interaction feedback selection for the first location from the second location interaction feedback and the third location interaction feedback; and
communicate with at least one fourth electronic device to cause presentation of the interaction feedback selection including feedback audio at the first location by the at least one fourth electronic device, the at least one fourth electronic device is separate from the first electronic device.

16. The system of claim 15, wherein the processor:
determines that a combination of the second location interaction feedback and the third location interaction feedback is less than a sound threshold; and
generates the interaction feedback selection by combining the second location interaction feedback and the third location interaction feedback.

17. The system of claim 15, wherein the processor:
determines that a combination of the second location interaction feedback and the third location interaction feedback equals or exceeds a sound threshold; and
generates the interaction feedback selection using one of the second location interaction feedback and the third location interaction feedback.

18. The system of claim 17, wherein the processor determines the sound threshold based on an audio level of the main content.

19. The system of claim 15, wherein the processor:
evaluates previous interaction feedback to determine interest scores associated with previous interactors; and
generates the interaction feedback selection by selecting between the second location interaction feedback and the third location interaction feedback using the interest scores.

20. The system of claim 15, wherein the processor:
receives user input from the first electronic device; and generates the interaction feedback selection using the user input.

* * * * *